US011906580B2

(12) United States Patent
Partiwala et al.

(10) Patent No.: US 11,906,580 B2
(45) Date of Patent: Feb. 20, 2024

(54) AUTOMATED OVERCLOCKING USING A PREDICTION MODEL

(71) Applicant: Hewlett-Packard Development Company, L.P., Spring, TX (US)

(72) Inventors: Suketu Partiwala, Palo Alto, CA (US); Hiren Bhatt, Wilmington, DE (US); Dhruv Jain, Mississauga (CA); Chihao Lo, Palo Alto, CA (US); Arnaud Froment, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 388 days.

(21) Appl. No.: 17/289,057

(22) PCT Filed: Dec. 7, 2018

(86) PCT No.: PCT/US2018/064531
§ 371 (c)(1),
(2) Date: Apr. 27, 2021

(87) PCT Pub. No.: WO2020/117270
PCT Pub. Date: Jun. 11, 2020

(65) Prior Publication Data
US 2021/0405112 A1 Dec. 30, 2021

(51) Int. Cl.
*G01R 31/317* (2006.01)
*G06F 30/3312* (2020.01)
(Continued)

(52) U.S. Cl.
CPC .......... *G01R 31/3172* (2013.01); *G06F 1/08* (2013.01); *G06F 30/3312* (2020.01); *G06F 2115/10* (2020.01); *G06F 2119/12* (2020.01)

(58) Field of Classification Search
CPC ............ G06F 11/0721; G06F 11/0754; G06F 11/3024; G06F 11/3055; G06F 11/3089;
(Continued)

(56) References Cited

U.S. PATENT DOCUMENTS 7,382,366 B1   6/2008   Klock et al.
7,996,702 B2 *   8/2011   Xue ................... G06F 11/0757
                                                            713/400
(Continued)

FOREIGN PATENT DOCUMENTS

CN       101051271 A       10/2007
CN       101187831 A        5/2008
(Continued)

OTHER PUBLICATIONS

Kun-Xian Xiao, CN 101876845 A, "Overclocking Control Method and Program of Central Processor", Date Published: Nov. 3, 2010 (Year: 2010).*

*Primary Examiner* — John H Le
(74) *Attorney, Agent, or Firm* — Quarles & Brady LLP

(57) ABSTRACT

A system, a method, and a machine-readable medium for overclocking a computer system is provided. An example of a method for overclocking a computer system includes predicting a stable operating frequency for a central processing unit (CPU) in a target system based, at least in part, on a model generated from data collected for a test system. An operating frequency for the CPU is adjusted to the stable operating frequency. A benchmark test is run to confirm that the CPU is operating within limits.

20 Claims, 12 Drawing Sheets

(51) Int. Cl.
*G06F 1/08* (2006.01)
*G06F 115/10* (2020.01)
*G06F 119/12* (2020.01)

(58) Field of Classification Search
CPC ............. G06F 11/3428; G06F 11/3476; G06F 30/3312; G06F 1/08; G06F 1/206; G06F 1/324; G06F 2115/10; G06F 2119/12; G01R 31/30; G01R 31/2857; G01R 31/3172; Y02D 10/00
USPC ........................................................ 702/186
See application file for complete search history.

(56) References Cited

U.S. PATENT DOCUMENTS

| | | |
|---|---|---|
| 8,495,444 B2 | 7/2013 | Knebel et al. |
| 8,788,986 B2 | 7/2014 | Zink et al. |
| 8,935,558 B2 * | 1/2015 | Chen .................... G06F 11/2289 |
| | | 713/502 |
| 9,910,481 B2 | 3/2018 | Lee et al. |
| 2008/0098254 A1 | 4/2008 | Altevogt et al. |
| 2009/0235108 A1 | 9/2009 | Gold et al. |
| 2010/0131221 A1 | 5/2010 | Chien |
| 2011/0161706 A1 | 6/2011 | Huang et al. |
| 2011/0191094 A1 | 8/2011 | Quernermoen et al. |
| 2013/0219209 A1 | 8/2013 | Chen et al. |
| 2016/0306727 A1 | 10/2016 | Kato et al. |
| 2018/0203750 A1 | 7/2018 | Nguyen et al. |

FOREIGN PATENT DOCUMENTS

| | | |
|---|---|---|
| CN | 101876845 B | 5/2012 |
| CN | 107203467 A | 9/2017 |
| CN | 107515663 A | 12/2017 |
| CN | 107923935 A | 4/2018 |

* cited by examiner

400

600

1000

AUTOMATED OVERCLOCKING USING A PREDICTION MODEL

BACKGROUND

Central processing units (CPUs), or processors, are currently provided in batches that include units that may run at a faster frequency mixed with units that run at a slower frequency. The entire batch of CPUs is rated to the slowest stable frequency for all CPUs in that batch. However, numerous CPUs in the batch may be run at faster frequencies, while maintaining stability and thermal performance. This is termed overclocking and may be used to gain some performance advantages, especially for gaming systems.

DESCRIPTION OF THE DRAWINGS

Certain exemplary embodiments are described in the following detailed description and in reference to the drawings, in which.

DETAILED DESCRIPTION

Generally, to perform an overclocking operation on a computing device, or computer system, a user would run a benchmark tool to determine a benchmark score. The benchmark score would be generated by the benchmark tool and would include output parameters such as system temperatures, CPU temperatures, CPU utilizations, maximum frequency, thermal throttling, power throttling, and the like. The user would increase input parameters, such as the operational frequency, the CPU voltage, the cache frequency, and the like. The user would then rerun the benchmark tool to determine the stability of the system and whether the system was staying within thermal limits.

These operations require a substantial amount of expertise for implementation. For example, a user may need to understand the computer architecture and the relationship between performance and frequency of the CPU. Further, the user may need to understand how the frequency is related to voltage and power supplied to the CPU, how heat is related to the frequency, what is throttling, and how to deal with extreme thermals. In addition, power application for short bursts versus average power that can be sustained over longer period of time may need to be determined. The user must also know what the maximum temperature limit for the CPU is to make sure that is not exceeded during the overclocking process.

Currently, overclocking can be done by users, mostly using manual tools. The user would increase the operational frequency of the CPU until the system was unstable, or running outside of thermal limits. Simple tools do exist to help with this process, such as system monitoring tools, temperature monitoring tools, and benchmarking tools, among others. However, the process remains complex, and slow to implement.

The techniques described in examples herein use a model of a target system, and data collected for the target system, to determine the overclocking rate that may be used in the target system. The model is created from data collected for test systems, such as in laboratory, corporate, and other use. The data may also include data collected for other target systems. In contrast to previous techniques, the overclocking procedure described herein is simple to implement by non-expert users and can be completed in a short timeframe, for example, less than about 10 minutes, less than about 5 minutes, or less than about 1 minute. In some examples, rebooting may not be needed to implement the overclocking.

Figure 1A:
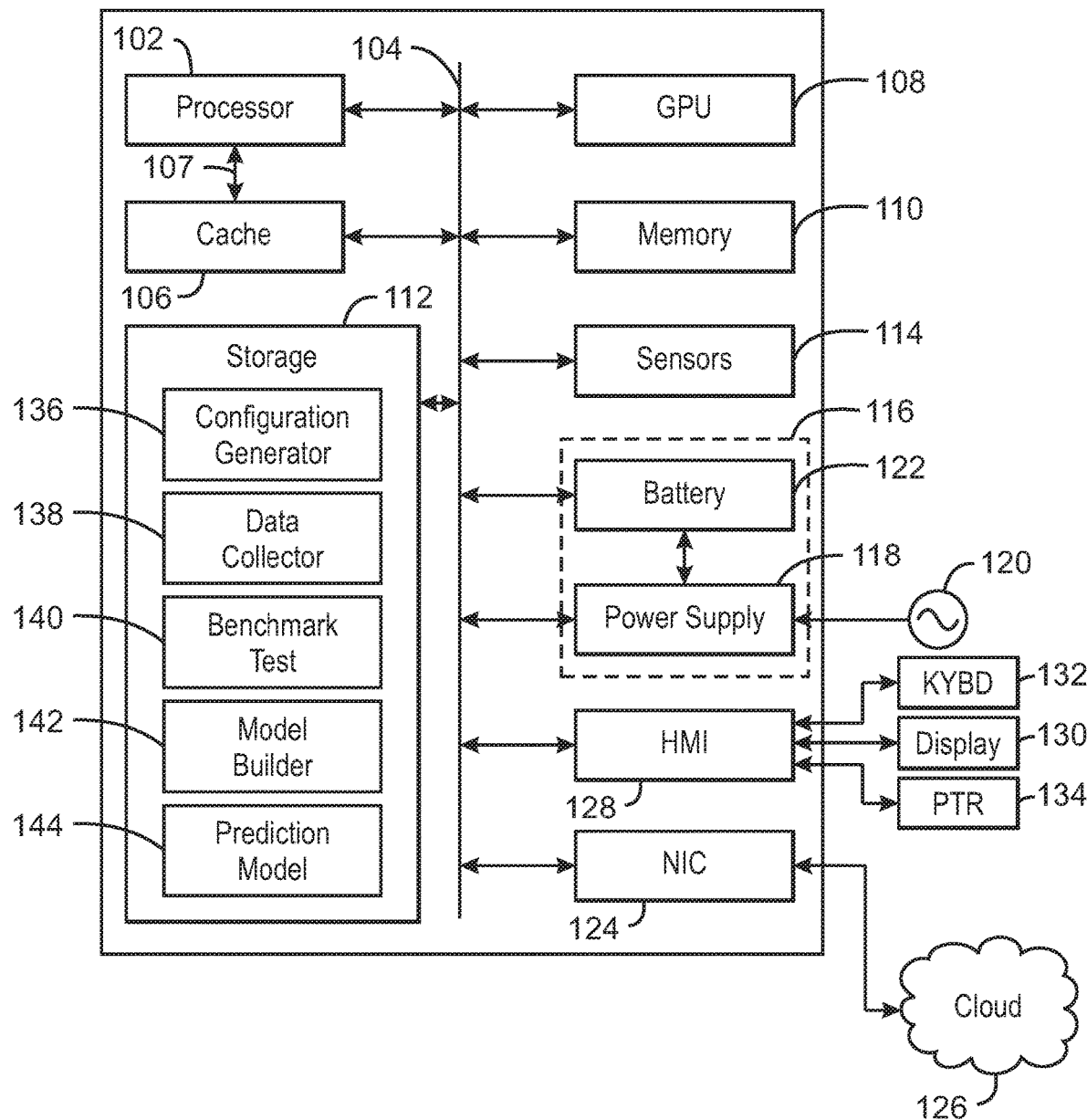
FIGS. 1(A) and 1(B) are block diagrams of a test system that may be used to generate a prediction model for overclocking a CPU, in accordance with examples.
Figure 1B:
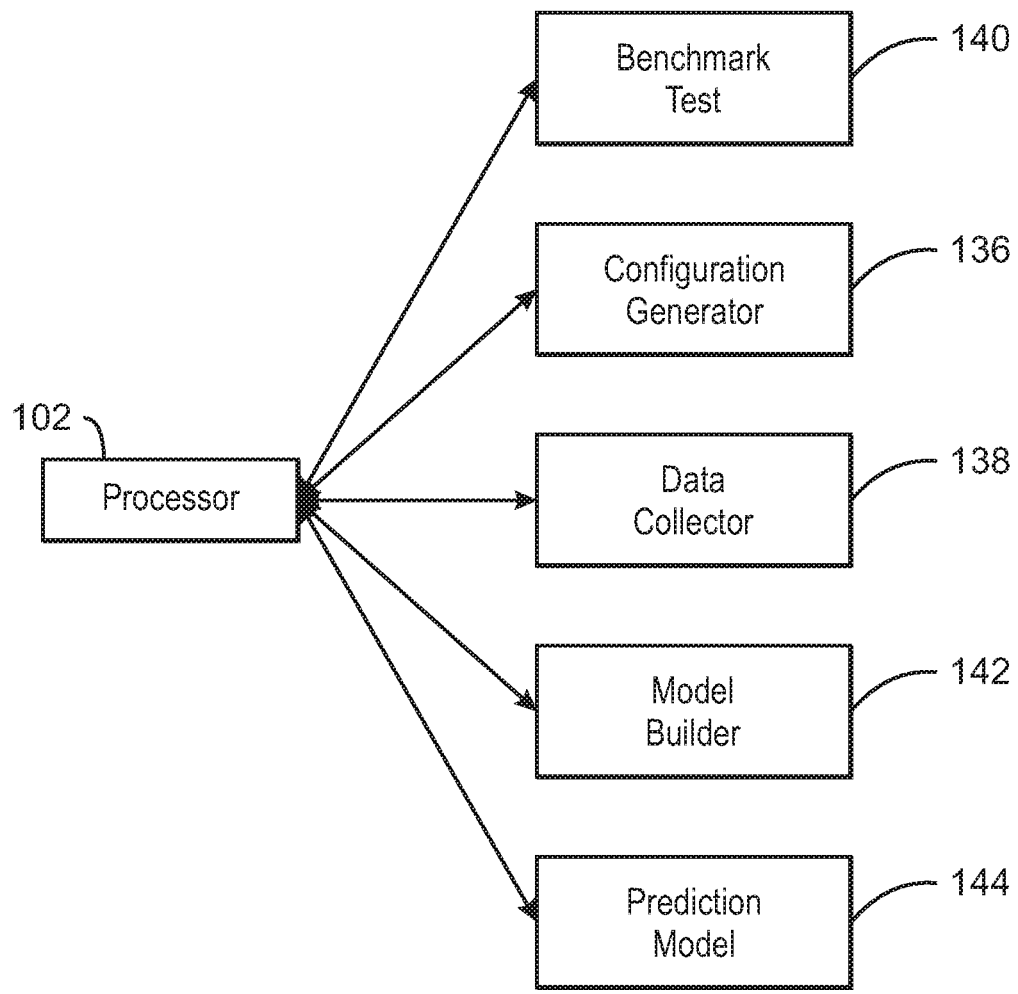

FIGS. 1(A) and 1(B) are block diagrams of a test system 100 that may be used to generate a prediction model for overclocking a central processing unit (CPU), in accordance with examples. The test system 100 includes a CPU 102 that executes stored instructions. In various examples, the CPU 102 is a microprocessor, a system on a chip (SoC), a single core processor, a dual core processor, a multicore processor, a number of independent processors, a computing cluster, or the like.

The CPU 102 is communicatively coupled to other devices in the test system 100 through a bus 104. The bus 104 may include a peripheral component interconnect (PCI) bus, and industry standard architecture (EISA) bus, a PCI express (PCIe) bus, high-performance interconnects, or a proprietary bus, such as used on a system on a chip (SoC). In some examples, multiple buses may be used to couple to other devices. For example, a PCIe bus may couple to a SATA (serial advanced technology attachment) bus to communicatively coupled the CPU 102 to a disk drive, memory, or other internal or external devices. In addition to communicatively coupling the CPU 102 to other devices, the bus 104 may include power lines to couple devices to a power supply.

The CPU 102 may be communicatively coupled to a memory cache 106 through the bus 104 or through direct links 107, such as high-performance interconnects. In some examples, the CPU 102 includes a memory cache 106 that includes multiple parts, both on-die with the cores of the CPU 102 and off-die, for example, in-package with the CPU 102, but on a separate die. The portion of the memory cache 106 that is on-die with the CPU 102 may operate at the same frequency as the cores of the CPU 102, while the portion of the memory cache 106 that is off-die may operate at a frequency that is independent of the CPU 102. The techniques described herein may be used to overclock a CPU 102 that is in any cache configuration. The cache voltage used by the memory cache 106 may also be adjusted independently of the voltage used by the CPU 102.

The bus 104 may couple the CPU 102 to a graphics processing unit (GPU) 108, such as units available from Nvidia, Intel, AMD, ATI, and others. If present, the GPU 108 provides graphical processing capabilities to enable the high-speed processing of graphical input and output, such as for games. In some examples, the operation of the GPU 108 is included in the overclocking. For example, the GPU 108 may interact with the CPU 102 increasing the stress on the CPU 102. Accordingly, a benchmark test may include operations of the GPU 108. As used herein, a benchmark test is a computer program that is designed to put stress on the computer system, such a multiple Fourier transform program designed to run on all cores of a computer system. As the benchmark test runs, the temperature of the CPU will increase, and as the frequency is increased, the benchmark test may become unstable and stop, or crash, for example, due to missed memory or cache accesses.

A memory device 110 and a storage device 112 may be coupled to the CPU 102 through the bus 104. In some examples, the memory device 110 and the storage device 112 are configured as a single unit, e.g., with a contiguous address space accessible by the CPU 102. The memory device 110 holds operational code, data, settings, and other information used by the CPU 102 for the overclocking procedure. In various examples, the memory device 110 includes random access memory (RAM), such as static RAM (SRAM), dynamic RAM (DRAM), zero capacitor RAM, embedded DRAM (eDRAM), extended data out RAM (EDO RAM), double data rate RAM (DDR RAM), resistive RAM (RRAM), and parameter RAM (PRAM), among others.

The storage device 112 is used to hold longer-term data, such as stored programs, an operating system, and other code blocks used to implement the functionality of the overclocking system. In various examples, the storage device 112 includes non-volatile storage devices, such as a solid-state drive, a hard drive, a tape drive, an optical drive, a flash drive, an array of drives, or any combinations thereof. In some examples, the storage device 112 includes non-volatile memory, such as non-volatile RAM (NVRAM), battery backed up DRAM, flash memory, and the like. In some examples, the storage device 112 includes read only memory (ROM), such as mask ROM, programmable ROM (PROM), erasable programmable ROM (EPROM), and electrically erasable programmable ROM (EEPROM).

Sensors 114 may be coupled to the CPU 102 through the bus 104. The sensors 114 may include physical sensors, such as temperature sensors, fan speed detectors, system temperatures, and the like. Further, the sensors 114 may include virtual or software sensors that obtain values from registers or settings, or determine the values from current conditions of the test system 100. The software sensors may include, for example, memory utilization sensors, CPU utilization sensors, CPU frequency sensors, cache frequency sensors, Turbo boost mode sensors, and the like.

In some examples, the sensors 114 include an ambient temperature sensor to include the ambient temperature in the overclocking model. However, other examples omit the ambient temperature sensor, as the temperature of the CPU 102 may be used. Other sensors, such as location determination sensors, may be used in the model to control the overclocking. For example, a system located in a southern state of the United States may not be able to be run at as higher frequency as a system located in a northern state of the United States.

The test system 100 may include a power system 116, for example, including a power supply 118 coupled to an AC power source 120 and the battery 122 that is discharged from the power supply 118. The battery 122, the power supply 118, or both, may be coupled to power lines in the bus 104 to provide power to other devices. Further, the battery 122, the power supply 118, or both, may be coupled to communication lines in the bus 104 to allow the CPU 102 to monitor the operations of the battery 122 or the power supply 118. For example, the CPU 102 may determine that the test system 100 is coupled to an AC power source 120, and monitor the charge level in the battery 122. The charge level in the battery 122 may then be used to adjust the overclocking values as needed.

A network interface controller (NIC) 124 may be used to couple the test system 100 to a network, or cloud 126. As used herein, a cloud 126 is a cluster of communicatively interconnected computers. The cloud 126 may include a wide area network (WAN), a local area network (LAN), or the Internet, among others. In various examples, this allows for the transfer of control information to the test system 100 and data from the test system 100 to units in the cloud 126. In some examples, the NIC 124 connects the test system 100 to a cluster computing network, or other high-speed processing system, where further processing of the data, for example, to generate the model may occur.

In some examples, a human machine interface (HMI) 128 may be included in the test system 100 for local control of the benchmarking and test procedure. The HMI 128 may communicatively couple a display 130, keyboard 132, and a pointing device 134, such as a mouse or touchscreen, to the CPU 102 through the bus 104. In other examples, the HMI 128, and any associated devices, are omitted and the benchmarking tests are run remotely. For example, the test system 100 may be part of a bank of test systems, collecting data for a number of different system configurations.

The storage device 112 may include code blocks used to implement the functionality of the overclocking procedure in the test system 100. In various examples, the code blocks include a configuration generator 136 that is used to generate a series of input parameter configurations for testing using a benchmark test, as described with respect to FIG. 5. The configuration generator 136 may be triggered by a data collector 138, for example, implementing the method described with respect to FIG. 4.

Figure 5:
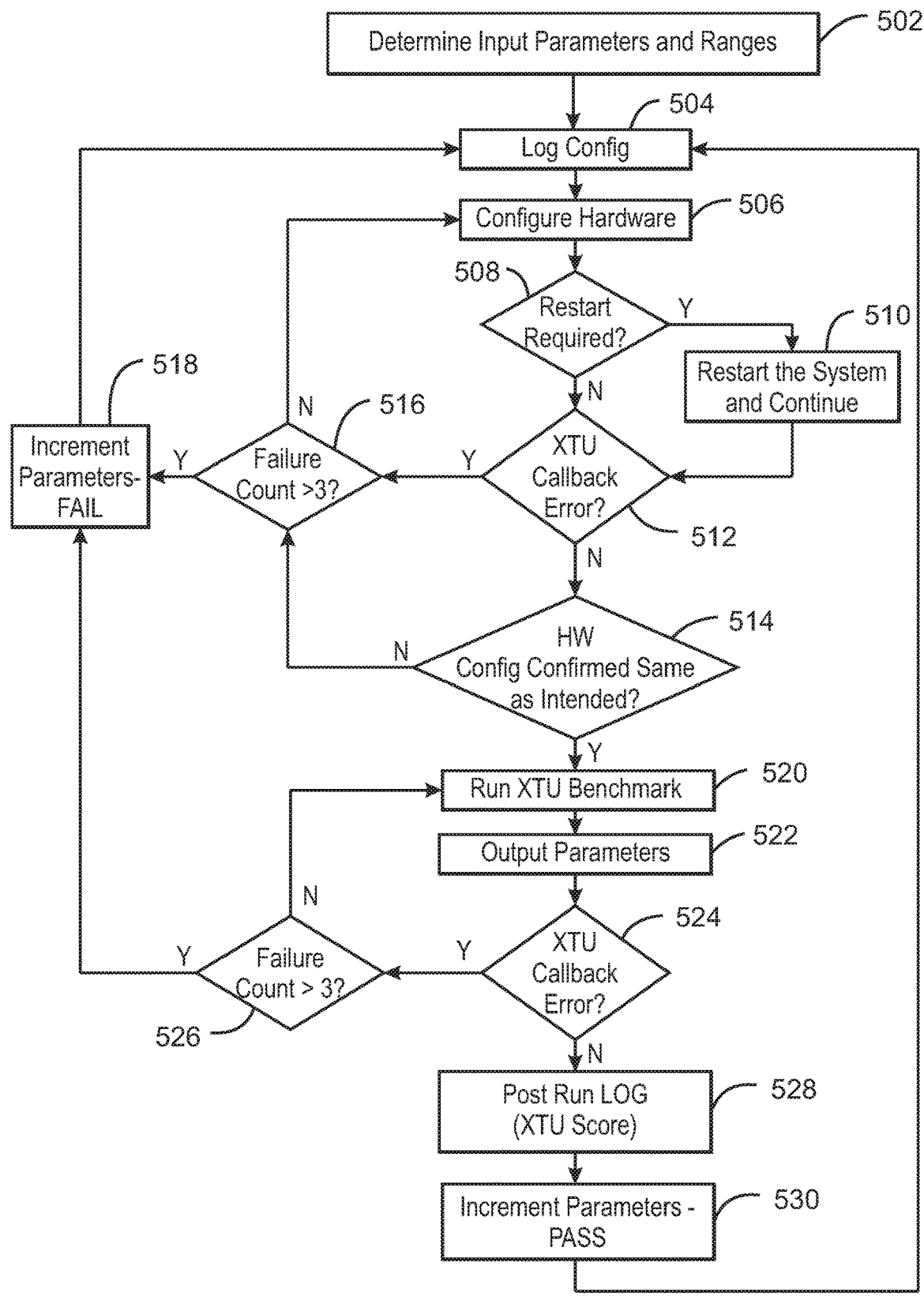
FIG. 5 is a process flow diagram of a method for collecting data to generate a prediction model for overclocking a CPU, in accordance with examples.

The data collector 138 may operate the benchmark test 140 to collect data at each of the input parameter configurations, for example, as described with respect to FIG. 5. Further, the data collector 138 may log the configuration of the input parameters and the collected data, or output parameters. If a configuration of input parameters causes the system to become unstable, extended temperature limits, or both, the data collector 138 may terminate the run, and continue with testing of other configurations of input parameters.

A model builder 142 may be used to correlate the input parameters to the output parameters for each of the system configurations used. The model builder 142 may exist in the test system 100 or may exist in a server in the cloud 126. Further, the model builder 142 may be configured and started in the test system 100, then transferred to a more powerful system in the cloud 126 for operation. allowing a faster generation of a prediction model 144.

In some examples, the model builder 142 generates a statistical correlation between output parameters and input parameters for a particular system configuration, which is saved as the prediction model 144. In other examples, other modeling techniques are used to generate the prediction model 144, such as neural networks, support vector machines (SVM), or other directed-learning techniques. Combinations of these techniques may be used in examples. For example, an SVM may be used to identify a particular system configuration to select a prediction model 144 for a target system from a group of prediction models for different configurations.

As shown in FIG. 1(B) not all of the devices and units shown in FIG. 1(A) are used in every test system 100. An average system configuration of the test system 100 may be used, wherein data from a number of test systems, each with slightly different configurations, is collected. In the average configuration, units that affect the overclocking, such as the presence or absence of a GPU 108, may be included in the model as an adjustment factor. In models generated using machine learning, such as neural networks, these units may be included as individual inputs to the prediction model 144, during the training process, and during implementation. Generally, the configuration of the test system 100 used to generate the prediction model 144 is similar to, or identical to, the configuration of the target system 200.

Figure 2:
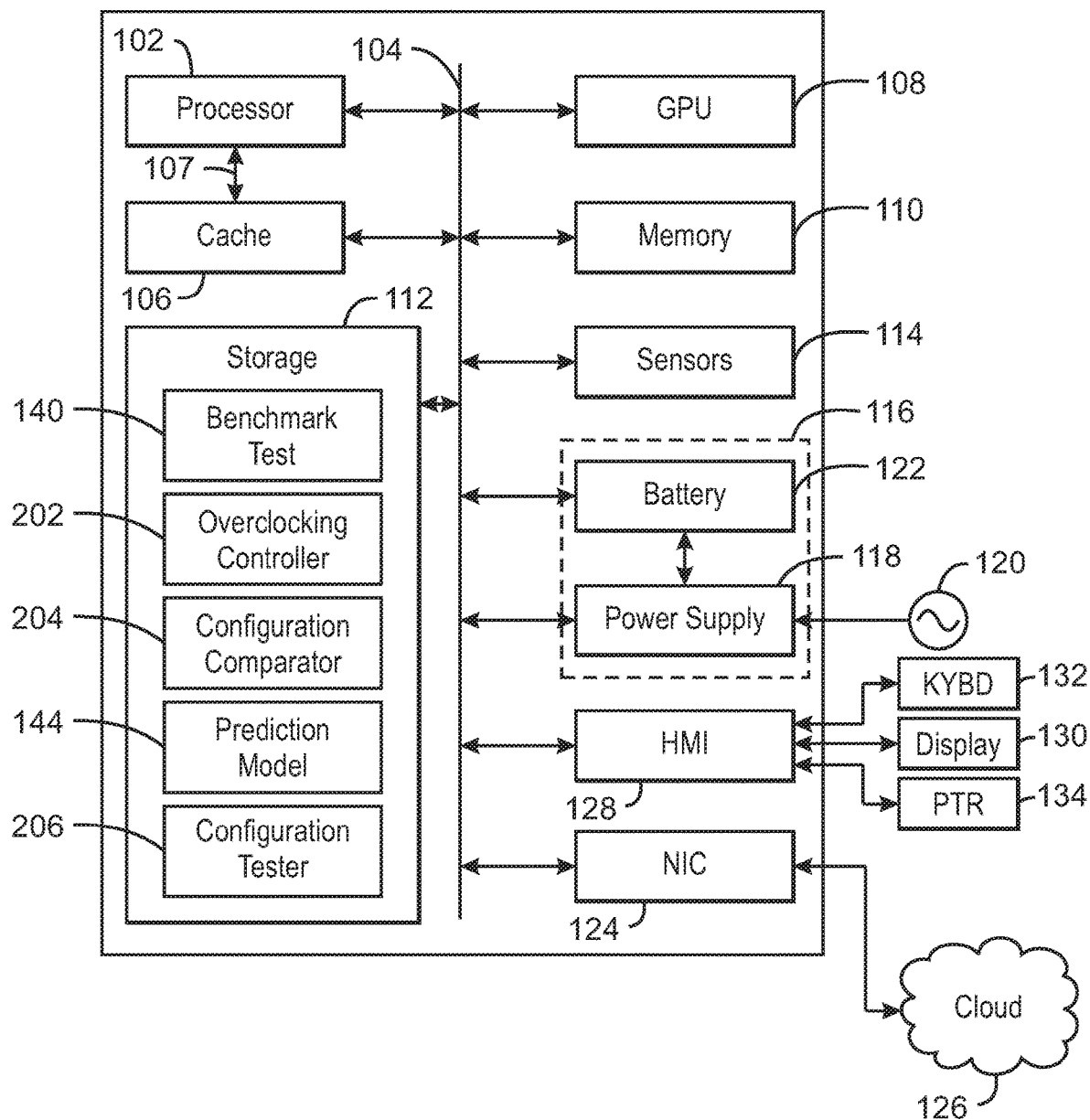
FIG. 2 is a block diagram of a target system that may use a prediction model for overclocking the CPU, in accordance with examples.

FIG. 2 is a block diagram of a target system 200 that may use a prediction model for overclocking the CPU 102, in accordance with examples. Like numbered items are as described with respect to FIG. 1. As described herein, the target system 200 may be identical to the test system 100, or may have configuration differences that can be accounted for in the prediction models. The operational configuration selected for the prediction model, however, may use the same type of CPU 102 and memory cache 106.

In some examples, different code blocks may be included in the storage device 112 to implement the prediction model 144 on the target system 200. For example, an overclocking controller 202 may use a configuration comparator 204 to determine the differences in configuration between the target system 200 and the test system 100. If the prediction model 144 is based on an average configuration for the test system 100, differences between the configuration of the systems are provided to the prediction model 144. The overclocking controller 202 collects data, for example, output parameters on the target system 200 using the benchmark test 140 to determine how the target system 200 functions under different combinations of input parameters. The overclocking controller 202 then provides the data on the target system 200 to the prediction model 144. The prediction model 144 is then used to predict the input parameters, such as CPU frequency, CPU voltage, and the like, that may be used to achieve the maximum overclocking frequency for the system.

A configuration tester 206 may be included to rerun the benchmark test using the input parameters. The configuration tester 206 may be used to provide this information to servers in the cloud 126, which then may be included in further refinements of the prediction model 144. The configuration tester 206 may also be used, in addition to other systems built into the target system 200, to monitor the system to determine if the overclocking is too low or too high.

Figure 3:
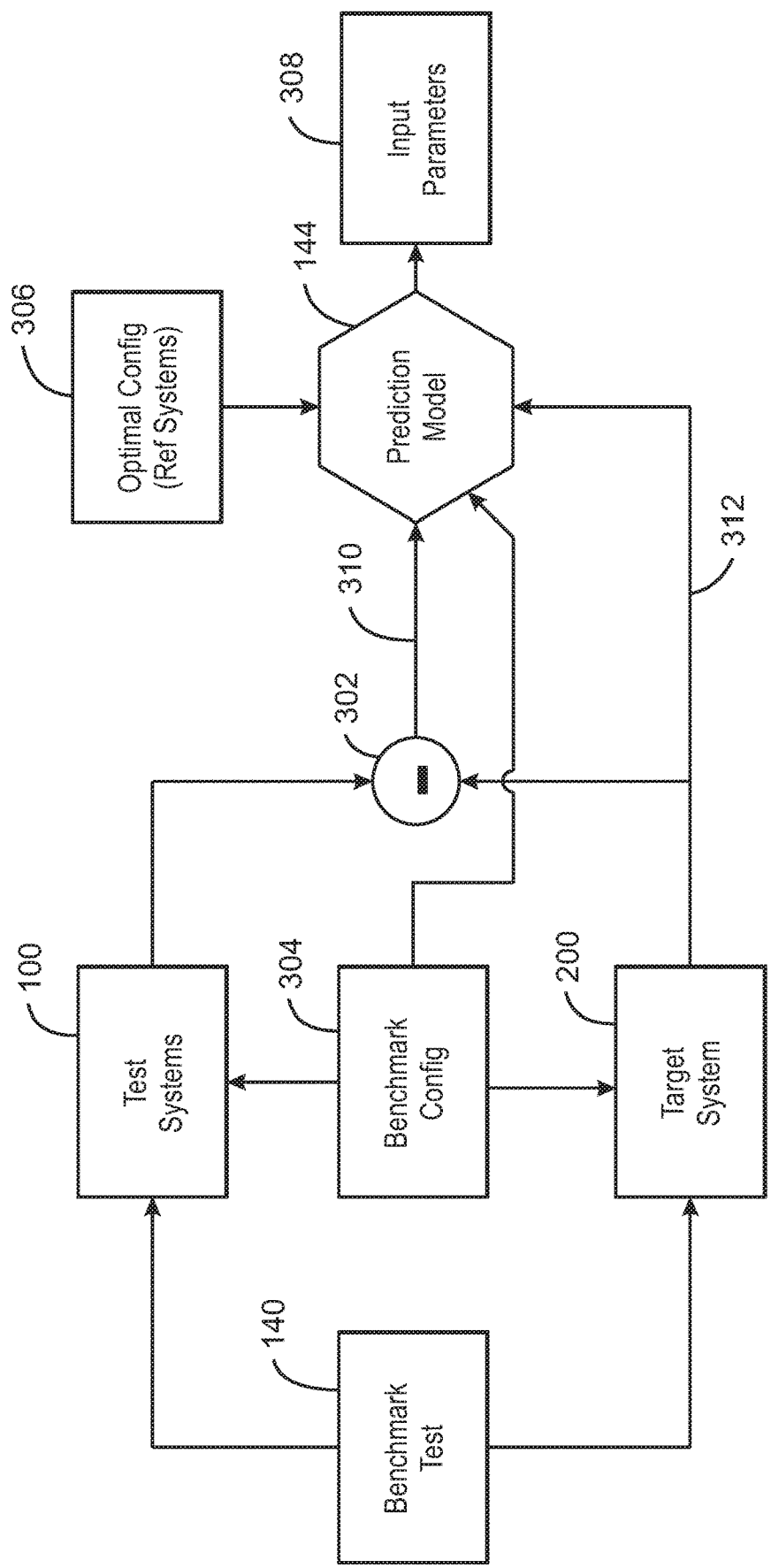
FIG. 3 is a schematic drawing of a process for generating input parameters for an overclocking configuration for a target system, in accordance with examples.

FIG. 3 is a schematic drawing of a process 300 for generating input parameters 308 for an overclocking configuration for a target system 200, in accordance with examples. In the process 300, a delta between the responses, or output parameters, of the target system 200 and the test system 100 is determined at block 302. To determine this, a benchmark test 140 is run on the target system 200. Previously run benchmark tests may have been used to collect data on test systems 100 that are similar to the target system 200. Various output parameters are monitored while the benchmark is being run, and the results are collected after the test and provided to the prediction model 144. Although the benchmark test 140 would need to be run under the exact same system configuration for both the target system 200 and the test system 100, the benchmark configuration may be performed for an average case, such as a model that is similar in configuration to a portion of an installed base of systems, for example, to allow it to run on a wide variety of target systems without causing problems. In some examples, the test system 100 will be selected to be as close as possible to the target system 200, then offsets will be used to account for system differences. As used herein, the offsets may be multipliers used to scale the predicted frequency, e.g., as a factor between about 0.5 and about 1.5. The offsets may be based on the differences between different models, which may affect the thermal performance of the computer system. Other offsets may be based on installed memory, the presence of a GPU, and the like. This is discussed further with respect to FIG. 4.

The differences in the output parameters determined at block 302 are provided to the prediction model 144, along with the benchmark configuration 304 of input parameters for which the results were obtained. Assuming an optimal configuration 306 for the test systems 100 is known, the prediction model 144 can predict the optimal configuration of input parameters 308 for the target system 200.

As an example, the prediction model 144 may include the following procedures to arrive at the final output. To begin, the margins 310 for the target system 200 are determined by analyzing the delta in the benchmark results determined at block 302. For example, if for a temperature, the test systems 100 were expecting a measurement of 85° C. but the target system 200 only saw 80° C., then the target system 200 has a margin 310 that is positive by 5° C. Accordingly, the prediction model 144 may predict that higher performance input parameters 308 can be set on the target system 200 than the test system 100, for example, allowing the operating frequency to be set at a higher level. In contrast, if the target system 200 gave a measurement of 88° C., then the target system 200 has a margin 310 that is negative by 3° C., and the prediction model 144 may predict that lower performance input parameters 308 can be set on the target system 200 than the test system 100. The delta in the benchmark results may used in predicting the input parameters, as the delta provides a measure of the current performance of the target system, allowing the input parameters to be tuned up or down accordingly.

The best optimized results are then predicted for the target system 200 from the prediction model 144. The prediction model uses the benchmark configuration 304, the results from the test systems 100 obtained using the benchmark configuration 304, the benchmark results 312 from the target system 200, and the margins 310 to arrive at this intermediate conclusion. Finally, the prediction model 144 uses the best optimized results for the target system 200, and the optimal configuration 306 for the test system 100 to arrive at the input parameters 308 that are the optimum configuration for the target system 200.

Figure 4:
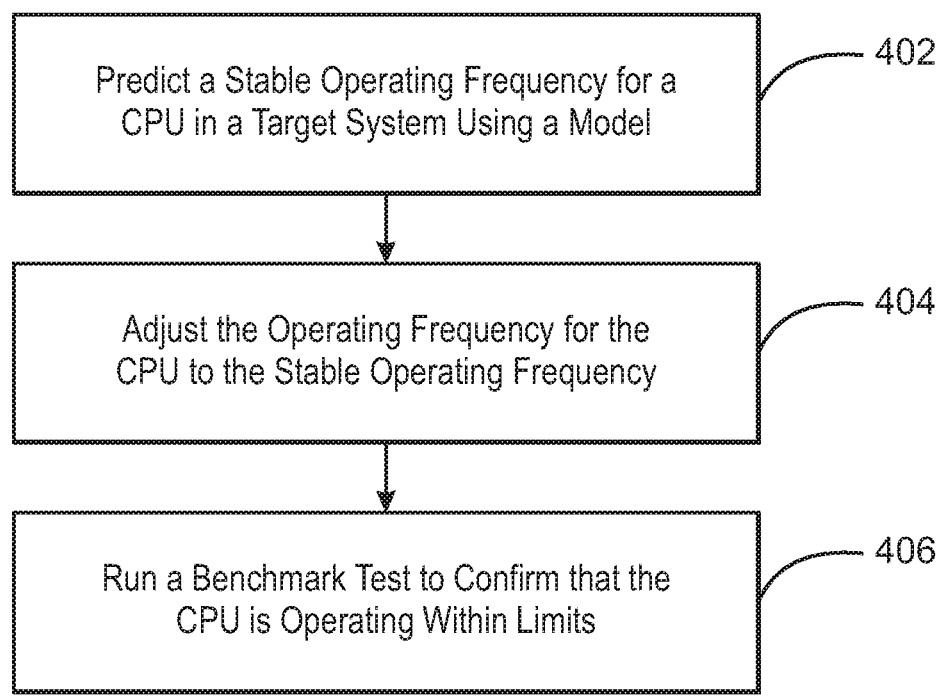
FIG. 4 is a process flow diagram of a method for overclocking a target system, in accordance with examples.

FIG. 4 is a process flow diagram of a method 400 for overclocking a target system, in accordance with examples. The method 400 begins at block 402 by predicting a stable operating frequency for a CPU in a target system. The prediction may be based, at least in part, on a model generated from data collected for a test system.

The prediction model 144 may be generated on a server running in the cloud, for example, to provide higher performance than possible on the test system. In some examples, the test system 100 provides input parameters and test data to the server, and receives the prediction model 144 back from the server. In other examples, the prediction model 144 is also run on the server, and provides the results back to the server. A different prediction model may be built for each type of system, such as a laptop system, a desktop system, or different form factors for desktop systems. The use of a different model for each of these system types allows for the model to include the important features of the system, such as thermal design and CPU choice. However, as described herein, the model does not have to account for every difference between the target and the test system, for example, if the disk size or memory size is different.

In addition to data collection from the test systems, each target system may also act as a data generator, for example, periodically providing benchmark test data and input parameters back to servers in the cloud to be used in the prediction models. Accordingly, the prediction model continues to improve as it uses data from both test systems and target systems.

At block 404, the operating frequency for the CPU is adjusted to the predicted stable operating frequency. At block 406, a benchmark test is run to confirm that the CPU is operating within limits. For example, that the temperature is less than a maximum operating temperature and the benchmark test execution is stable.

FIG. 5 is a process flow diagram of a method 500 for collecting data to generate a prediction model for overclocking a CPU, in accordance with examples. The method 500 collects data from a test system or a target system with minimal overhead.

The method 500 begins at block 502 with a determination of input parameters and ranges for the input parameters, as well as a determination of the increments that the input parameters are to be iterated over. For example, this may be performed by the configuration generator 136 of FIG. 1. The resulting configurations may be checked to determine if they are possible, for example, the CPU frequency may be tied to CPU voltage, eliminating some configurations. As an example, over 150 input parameters, descriptive parameters, and output parameters may be monitored and controlled during each run. The input parameters may include CPU frequency, for example, using a range with a multiplier of 30 to 50. The input parameters may also include a CPU voltage, for example, in a range of about 0.7 V to about 1.4 V. A cache frequency may be included, for example, using a range with a multiplier of 30 to 50. Other input parameters may also be included. Descriptive parameters that may be used in the model are shown in Table 1. Output parameters that may be monitored are shown in Table 2.

TABLE 1

System description parameters that may be used in the model.

| TYPE | DESCRIPTIVE PARAMETER |
|---|---|
| SYSTEM HW PARAMETERS | CPU TYPE |
| | Number of cores |
| | Number of threads |
| MEMORY PARAMETERS | Memory capacity |
| | Memory profile |
| | Timing parameters (tCL, tRCD, etc.) |

TABLE 1-continued

System description parameters that may be used in the model.

| TYPE | DESCRIPTIVE PARAMETER |
|---|---|
| STORAGE PARAMETERS | Storage size |
| | Storage type |
| SYSTEM SW PARAMETERS | OS version |
| | BIOS version |
| | EC version |
| | On AC |
| CPU/SOC PARAMETERS | Max Non-Turbo Boost Ratio = default (static) |
| | Core voltage = [0.7 v-1.5 v, 5 mw interval] |
| | CPU Core IccMax = [range, auto] |
| | CPU[all] freq. multiplier = [30x-50x], all combinations |
| | Cache ratio = [30x-50x] |

TABLE 2

Output parameters that may be used in the model
OUTPUT PARAMETER

Package Temp Max & Avg.
Max Core Freq
Memory utilization Max & Avg.
CPU[all] temp Max & Avg.
CPU[all] freq. Max & Avg.
CPU[all] utilization Max
CPU[all] utilization Avg.
Cache freq. Max & Avg.
Thermal throttling percentage
Power limit throttling percentage
Current limit throttling percentage
Memory freq. Max & Avg.
CPU fan speed Max & Avg.

At block 504, the configuration of input parameters to be used for a particular iteration is logged. At block 506, the hardware is configured, for example, with the CPU frequency and voltage entered into the BIOS. At block 508 a determination is made as to whether a restart is required to enter the input parameters. If so, at block 510 the system is restarted.

If no restart is needed, or after the restart occurs, at block 512 a determination is made if there is an XTU callback error present. As used herein, the XTU is the extreme tuning utility available from the Intel Corporation that may be used as a benchmark test herein. However, the techniques are not limited to the use of the XTU. In some examples, other types of benchmark tests are used, including benchmark tests that are specifically designed to increase the amount of stress on the system.

If no XTU callback error is determined to be present at block 512, at block 514 a confirmation is made as to whether the hardware configuration matches the intended confirmation. As used herein, the intended configuration is the expected value for the input parameters, such as the CPU frequency and CPU voltage, among others. If not, process flow proceeds to block 516. At block 516, a determination is made as to whether a failure count is greater than a threshold value, such as three. If not, process flow returns to block 506 to repeat the hardware configuration process. If the failure count is greater than three at block 516, process flow proceeds to block 518. At block 518, the input parameters are incremented, taking into account the failure. Process flow then proceeds to block 504 to restart the configuration process.

If, at block 514, it is confirmed that the hardware configuration matches the intended configuration, process flow proceeds to block 520. At block 520, the XTU benchmark test is run. At block 522, the output parameters are monitored and logged. These may include, for example, all or a portion of the parameters listed in Table 2.

At block 524 a determination is made as to whether an XTU callback error is present. If so, at block 526, a determination is made as to whether a failure count is greater than a threshold value, such as three. If the failure count is greater than three, process flow proceeds to block 518 to increment the input parameters, taking into account the failure. Process flow then proceeds to block 504 to log the new configuration and start the next iteration of the data collection process.

If at block 524 no XTU callback error is determined to be present, at block 528 a post run log comprising the XTU score is recorded. At block 530 the input parameters are incremented, taking into account the success of the last run. Process flow then returns to block 504 for the next iteration of the data collection process.

If at either block 518 or block 530, incrementing the input parameters will take an input parameter outside of the final range determined at block 502, the process may be terminated. Further, the process may be terminated at block 518 after a predetermined number of failure calls from block 516 or block 526. For example, this may be after three failure calls, six failure calls, 10 failure calls, or more.

The method 500 for the data collection may be implemented in the test systems 100, described with respect to FIG. 1, or in the target system 200, described with respect to FIG. 2. For example, blocks 504-530 may be implemented by the data collector 138 described with respect to FIGS. 1(A) and 2. In the test systems 100, multiple sets of data may be collected by allowing the method 500 to run over a number of hours, such as overnight. In some examples, the method 500 may run about 40 different configurations in an hour, allowing about 500 data sets to be collected in an eight-hour period for a single system.

A smaller version of the data collection tool, including the method 500, could be provided for use on target systems 200 owned by users. In some examples, an incremental overclocking tool would be run on a user system (such as target system 200). The incremental overclocking tool would run for about 15 minutes on the target system 200 and generate data sets for about 10 configurations of input parameters. If an owner of the target system 200 provided permission, the data sets would be fed back to central servers in the cloud to provide further data for training the models described herein.

Figure 6:
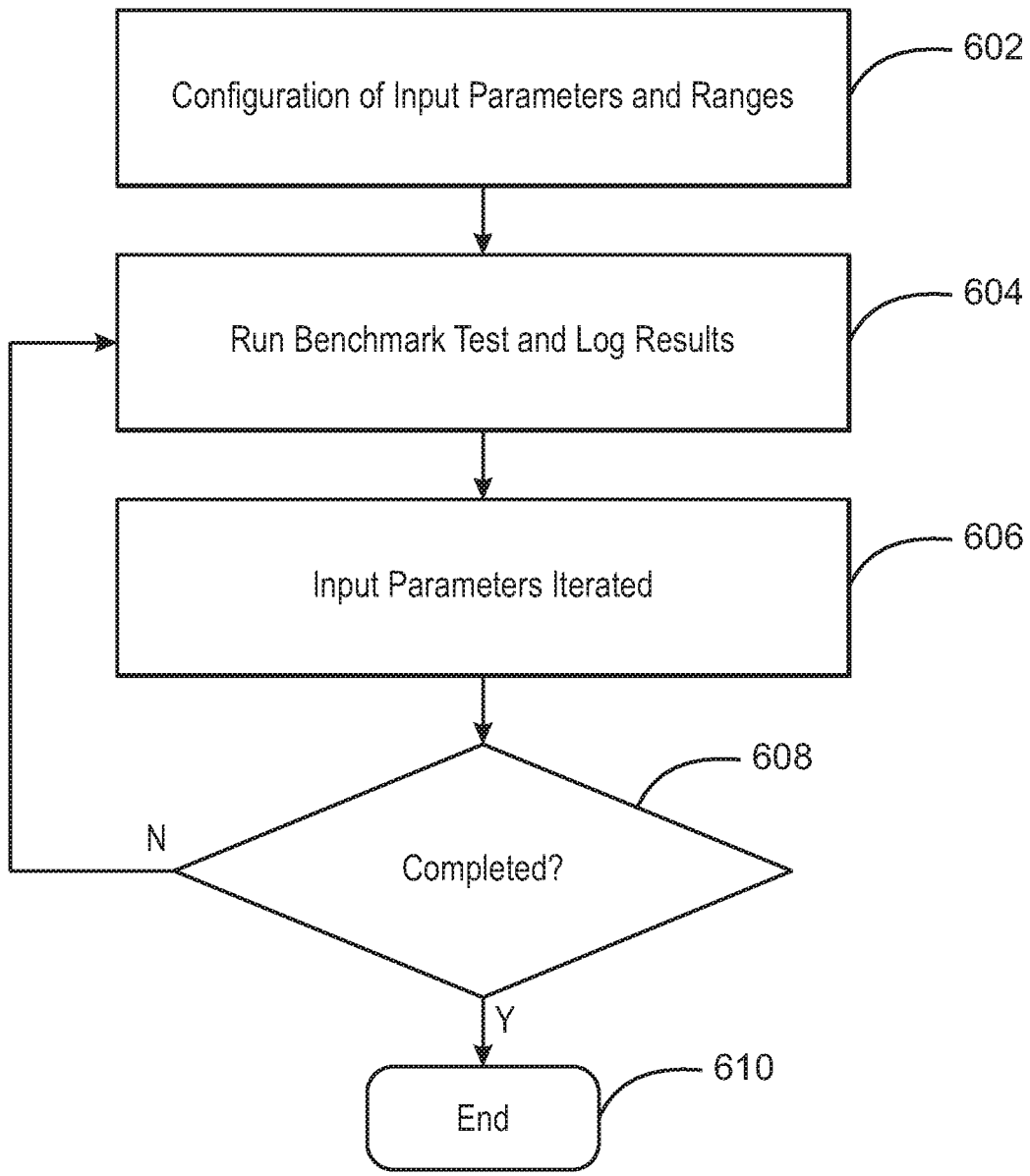
FIG. 6 is a process flow diagram of a simplified method for collecting data to generate a prediction model for overclocking the CPU, in accordance with examples.

FIG. 6 is a process flow diagram of a simplified method 600 for collecting data to generate a prediction model for overclocking the CPU, in accordance with examples. The method 600 begins at block 602 with the configuration of input parameters, ranges, and increments. This may include blocks 502-516 of the method 500 of FIG. 5.

At block 604, the benchmark test is run. This may include blocks 520-528 of the method 500 of FIG. 5. The benchmark test is the XTU test in some examples, or a proprietary stress test in other examples. As the benchmark test is run, the data is logged.

At block 606, the input parameters are iterated using the increment determined in block 602. This may include blocks 518 and 530 of the method 500 of FIG. 5. At block 608, a determination is made as to whether the data collection is completed. This may occur when an incremental increase in an input parameter takes the input parameter outside of the range determined at block 602. This may also occur when a number of sequential failures are detected, leading to termination of the method 600. If, at block 608, the determination is made that the data collection is still proceeding, process flow returns to block 604 to continue. Otherwise, the process ends at block 610.

Figure 7:
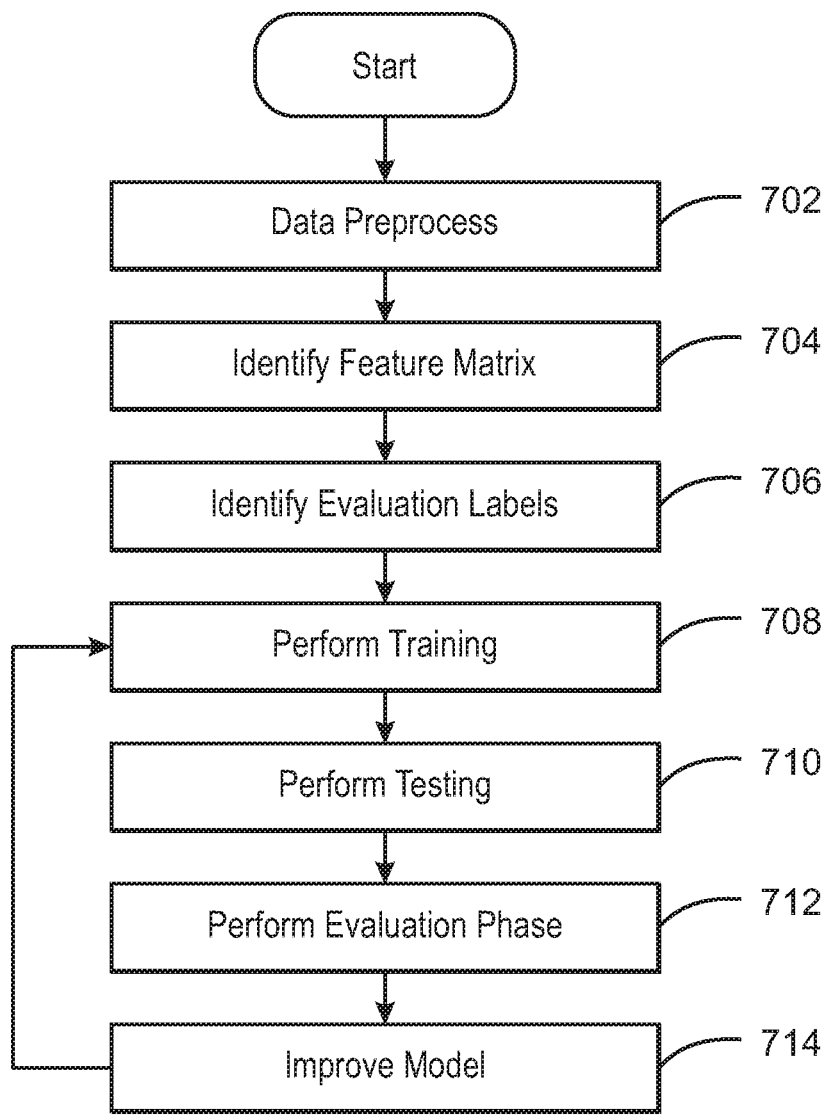
FIG. 7 is a process flow diagram of a method for generating a prediction model, in accordance with examples.

FIG. 7 is a process flow diagram of a method 700 for generating a prediction model, in accordance with examples. This method may be implemented by the model builder 142, described with respect to FIG. 1. As described herein, the performance of CPU overclocking is not only a function of frequency, but also depends on other input parameters. By understanding the relationship between these input parameters and overclocking performance, a better prediction can be made for input parameters to overclock a target system. This may increase the speed of the overclocking process and eliminate multiple reboots.

In some examples, the prediction models are based on multivariate linear regression. In addition to creating a model, the multivariant regression provides insight into the relationship between various input parameters and their effects on overclocking performance. The feature set selected, for example, the input parameters and the output parameters, are based on the system architecture and known relationships between various parameters. For example, thermal parameters have a high correlation with overclocking, but the quantification of this effect is difficult. The model generation process used herein may provide insight into that quantification, as well as identifying other important features affecting the overclocking performance.

As described herein, a simple approach is used to train and validate the prediction model. The collected data for the test system is divided into training data sets and validation data sets. The prediction model is trained using the training data sets, for example, to generate a multivariant equation. The validation data sets are then used to test the selection of the prediction model and its output. The accuracy of prediction may be determined by a simple mean squared difference between observed prediction with measured outcome.

The method begins at block 702, where the data is preprocessed. The data collector tool, described as method 500 of FIG. 5, may generate data in a comma-separated values (CSV) file format, which can be read, cleaned up to eliminate errors and inconsistencies, and parsed into matrices using software libraries. Further, outliers, or points that came from data misreads, can be eliminated. The matrices can be partitioned or split to form a training data set and a validation and testing data set, for example, using a 60/40 split, a 50/50 split, or a 40/60 split, among others.

At block 704, an Identity feature matrix is formed to include the CPU frequencies, the CPU temperatures, and the CPU voltages. At block 706, the evaluation labels are identified. The evaluation labels may be data that includes single values or binary values, such as stability, an XTU benchmark score, overall system performance, power efficiency and battery life, acoustic noise level, and system temperature or heat production.

At block 708, a training phase is performed. Features to be scaled are identified, and the data set is scaled accordingly. As used herein, data scaling, which may be termed normalization, converts the data values to a scale that either matches other data range or in more manageable for computation. For example, a frequency parameter that is measured in gigahertz may be converted to a number that ranges from about 0.5 to about 1.5 to make the model computation less complex. The training set data is fitted, for example, generating a statistical regression between the output parameters and the input parameters to form a multivariant regression model or equation. Features may be reduced to increase the speed of the model, for example, eliminating the use of output parameters that are not directly affected by the CPU frequency and voltage.

At block 710, a testing phase may be performed. In the testing phase, the testing data set may be transformed to be consistent with the training data set. A prediction is based on the testing data set using the multivariant regression model (the prediction model), and a simple mean squared difference between the predicted outcome as a major valve may be determined.

At block 712, an evaluation phase may be performed. In the evaluation phase, an evaluation matrix may be generated, including, for example, a precision, a recall rate, an F1 score, and a sum of the least squares error or R2 score, among others.

At block 714, the model may be improved using the evaluation matrix. For example, another classification model may be selected. In some examples, the classification parameters, or model coefficients, may be fine-tuned to lower the sum of the least squares error, or improve other measures of fitness in the evaluation matrix. Process flow may then return to block 708 to continue iterating the improvement of the model, for example, until a desired measure of fitness for the prediction model is reached.

Once an equation, or prediction model, is developed relating input parameters to output parameters, a search algorithm may use the equation to locate an optimal configuration, for example, through known techniques for locating surface minima or maxima. This is described further with respect to FIGS. 11 and 12.

Figure 8:
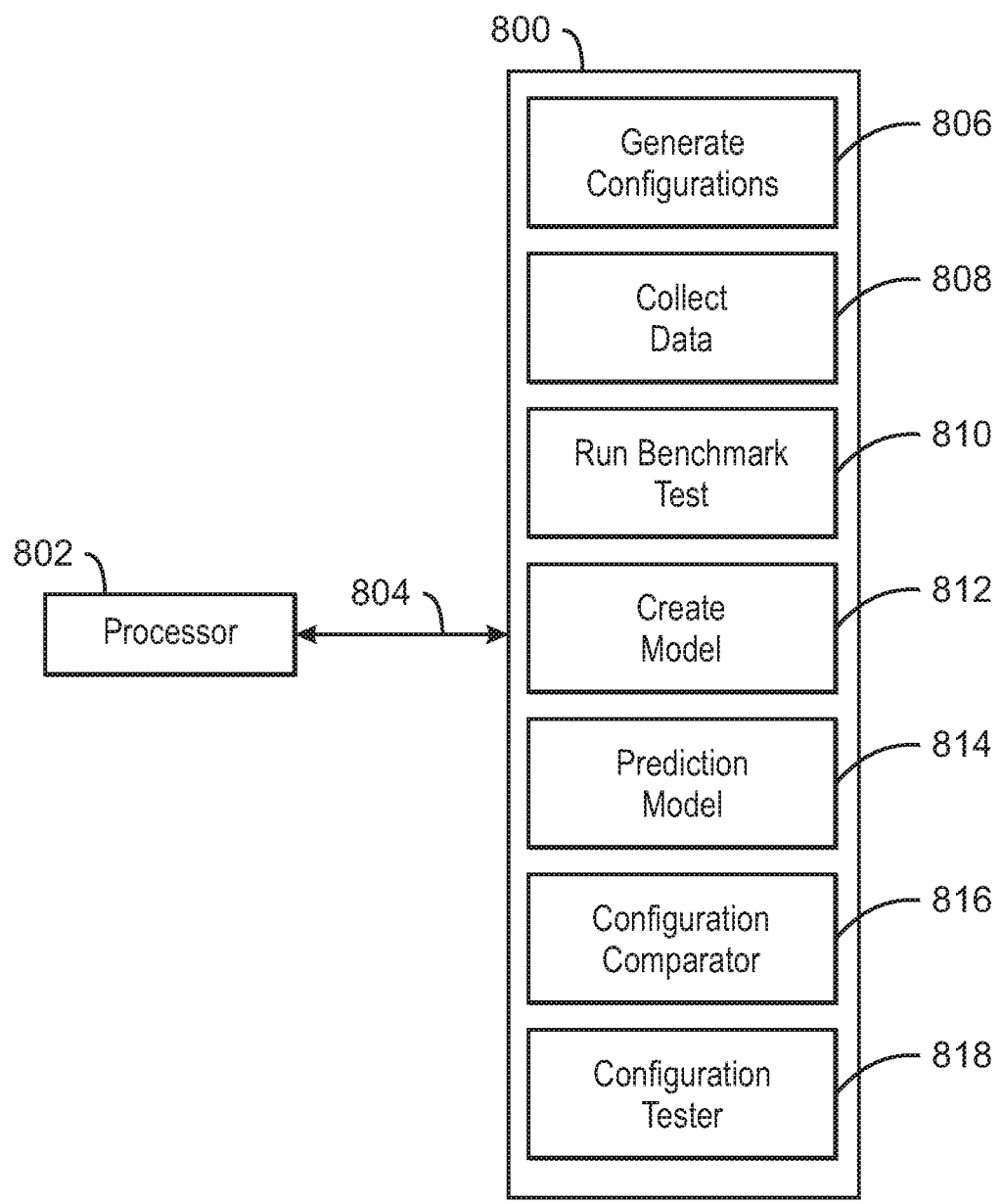
FIG. 8 is a drawing of a machine-readable medium comprising code to direct a CPU to create and use a prediction model for overclocking a target system, in accordance with examples.

FIG. 8 is a drawing of a machine-readable medium 800 comprising code to direct a CPU 802 to create and use a prediction model for overclocking a target system, in accordance with examples. As used herein, the machine-readable medium 800 may include the storage device 112 described with respect to FIGS. 1(A) and 2.

The machine-readable medium 800 is accessed by the CPU 802 through a bus 804, as described with respect to FIGS. 1(A) and 2. The machine-readable medium 800 may include code 806 to generate configurations of input parameters and output parameters for developing a prediction model. As described herein, these may include ranges for input parameters and increments to be used during iterations. Code 808 may be included to collect data on the response of the output parameters to the input parameters, for example, as described with respect to FIGS. 5 and 6. Code 810 may be included to direct the CPU 802 to run a benchmark test, such as the XTU benchmark test described herein. Code 812 may be included to direct the CPU 802 to create a prediction model 814, for example, as described with respect to FIG. 7.

Code 816 may also be included to direct the CPU 802 to compare the configuration of the current system to a test system or an average configuration of a test system. This may be used to select the appropriate prediction model 814 for the current system.

Code 818 may be included to direct the CPU 802 to set the input parameters for the current system to those predicted by the prediction model 814. The code 818 may also direct the CPU 802 to test the configuration.

Not all of the code described above is necessary in every local implementation. For example, the code 806 used to generate configurations may be located in a cloud server system. Further, the code 812 used to generate a prediction model 814 may also be located on a server in the cloud. An example of this is described with respect to FIG. 9.

Figure 9:
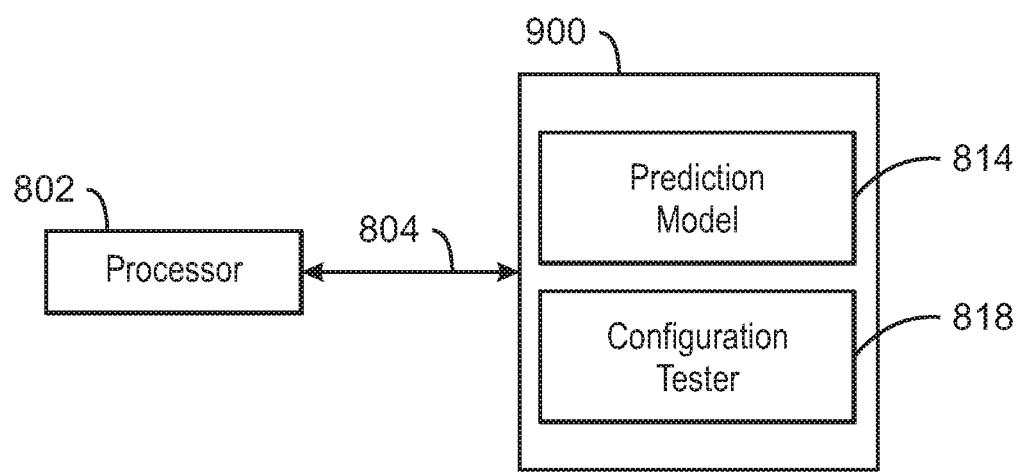
FIG. 9 is a drawing of a simplified machine-readable medium comprising code to direct a CPU to use a prediction model for overclocking a target system, in accordance with examples.

FIG. 9 is a drawing of a simplified machine-readable medium 900 comprising code to direct a CPU to use a prediction model for overclocking a target system, in accordance with examples. Like numbered items are as described with respect to FIG. 8.

Figure 10:
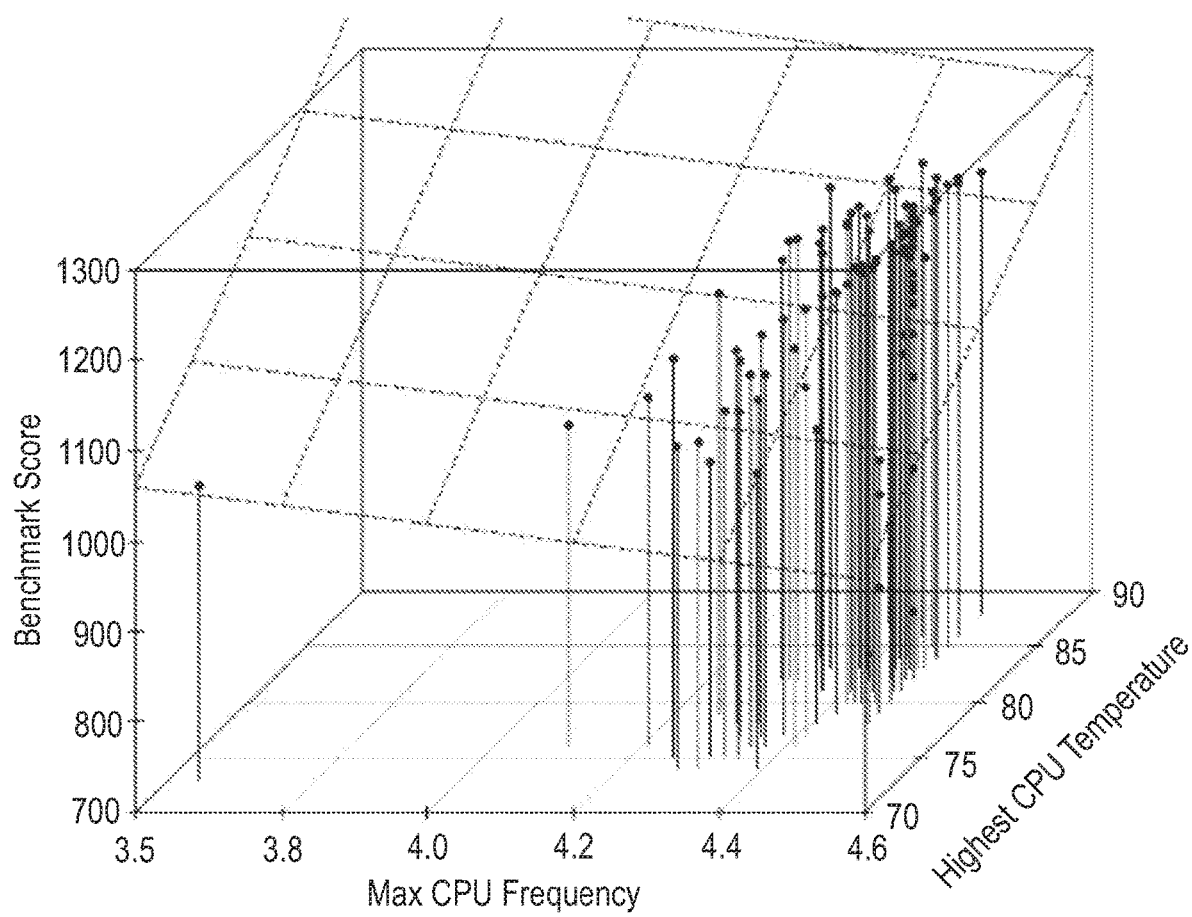
FIG. 10 is a 3-dimensional (3D) plot of measurements of a benchmark score versus maximum CPU frequency and higher CPU temperature, in accordance with examples.

FIG. 10 is a 3-dimensional (3D) plot 1000 of measurements of a benchmark score versus maximum CPU frequency and higher CPU temperature, in accordance with examples. As shown in the plot 1000, an initial linear regression may be used to correlate the benchmark score from a benchmark test, such as the XTU benchmark test, to the max CPU frequency and CPU temperature.

The 3D plot 1000 depicts a sample of the regression, although this is a partial view. In the 3D plot 1000, there are two dependent variables and one independent variable. However, beyond three dimensions it is not possible to easily visualize a plot where the number of independent variables is more than two and more than one independent variable may be present. The 3D plot 1000 does provide visual insight into the correlation of these parameters. As more data is collected from test systems, as well as target systems, the model improves.

Figure 11:
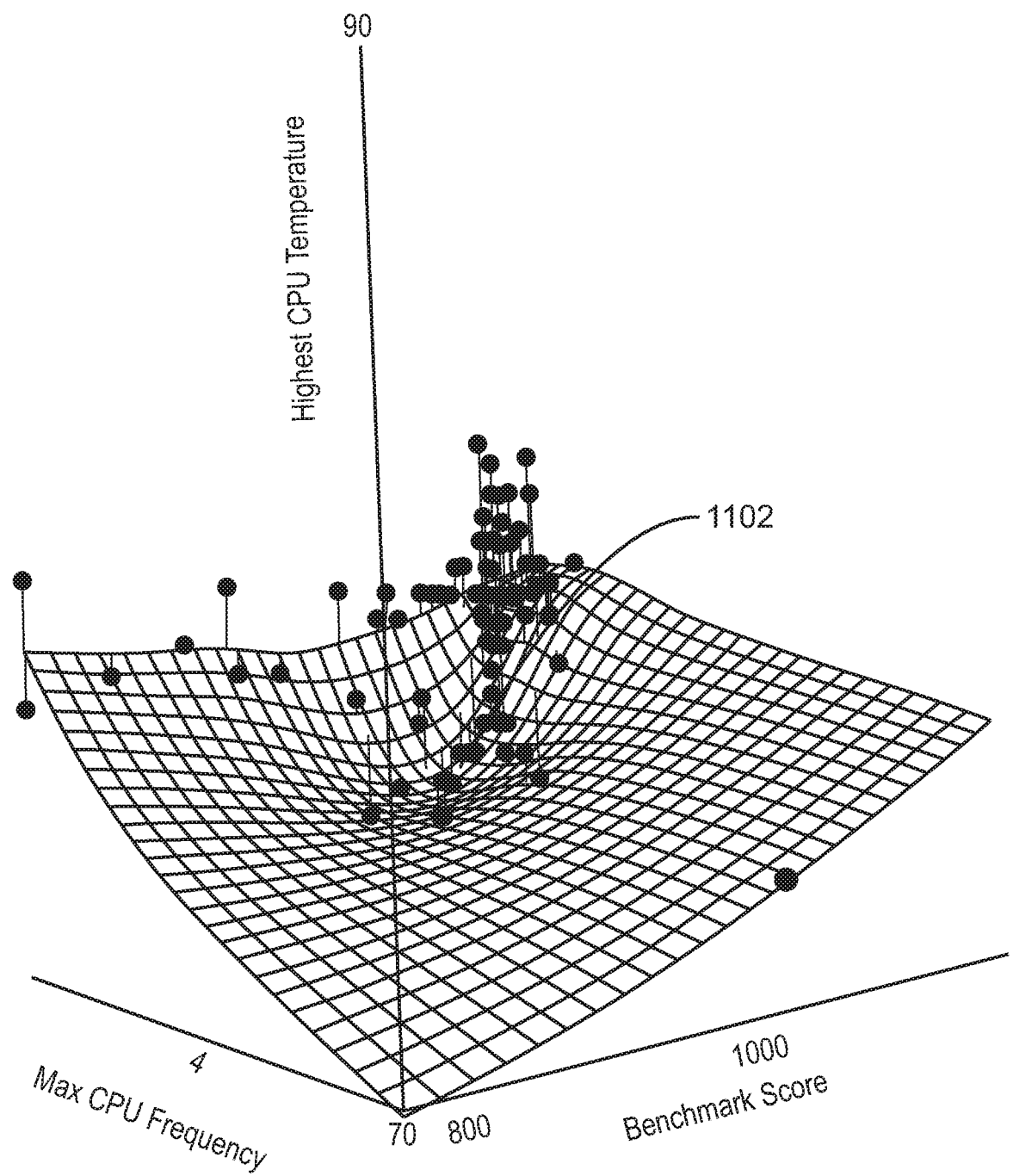
FIG. 11 is a 3-dimensional plot of the output of a prediction model relating the maximum CPU temperature to the max CPU frequency and the benchmark score, in accordance with examples.

FIG. 11 is a 3-dimensional plot 1100 of the output of a prediction model relating the maximum CPU temperature to the max CPU frequency and the benchmark score, in accordance with examples. In the 3D plot 1100 of FIG. 11, a three-dimensional surface is modeled. A search routine, such as a mesh search, a minima-hopping technique, a minimum path technique, or any number of other searching techniques may be used to find an operational minimum 1102 in a surface generated by the prediction model. As used herein, the operational minimum 1102 is a lowest value in a cost function, or loss function, that provides an operating point for setting the input parameters.

To generate the 3-dimensional plot 1100, multivariate regression was used to find a correlation between parameters affecting overclocking efficiency. The example of FIG. 11 is only one example, as other regressional analyses may use many more than three parameters.

In this example, the regression takes the form: $S=\beta_0+\beta_1 T+\beta_2 F+\varepsilon$, in which s denotes the Benchmark Score, T is core temperature and F denotes frequency. For the 3-dimensional plot 1100, the coefficients were $\beta_0=342.07$, $\beta_1=15.54$, and $\beta_2=-102.69$. In this example, the frequency values were divided by 10^9 to scale, but no other normalization or scaling was used.

As used below, hat notation denotes the estimated (predicted) values, and the bar notation denotes mean (or simple mean). The prediction value of the temperature can then be given as $\hat{S}=\hat{\beta_0}+\hat{\beta_1} T+\hat{\beta_2} F_i$. In forms of the ith term, it can be given as $\hat{s_i}=\hat{\beta_0}+\hat{\beta_1} t_i+\hat{\beta_2} f_i$.

In order to create a model, or fit a to a curve that could provide a good prediction for locating an operational minimum 1102, ordinary least squares may be used to estimate the coefficients. This is performed by minimizing the error surface, where minimum distances from the error surface can be calculated as shown in the following equations:

$$\hat{\beta_1} = \frac{\sum_{i=1}^{n}(t_i - \bar{t})(s_i - \bar{s})}{\sum_{i=1}^{n}(t_i - \bar{t})^2}, \text{ and}$$

-continued $$\widehat{\beta_2} = \frac{\sum_{i=1}^{n}(f_i - \bar{f})(s - \bar{s})}{\sum_{i=1}^{n}(f_i - \bar{f})^2}.$$

To test the predictions of the model a residual sum of squares (RSS) may be used, which can be defined as shown in the following equations:

$$RSS = \sum_{i=1}^{n}(s_i - \widehat{S_i})^2, \text{ and}$$

$$= \sum_{i=1}^{n}(s_i - \widehat{\beta_0} - \widehat{\beta_1} t_i - \widehat{\beta_2} f_i)^2.$$

As described herein, finding the operational minimum 1102 may be performed using a mapping technique on the prediction equation: $S = \beta_0 + \beta_1 T + \beta_2 F + \varepsilon$, to solve for the temperature, T. In one example, a 100×100 point grid of s and F is used to calculate the value of the temperature, T, at each of the points in the grid. The lowest value of T is selected as a new starting point, and the surrounding grid points are identified. Another 100×100 grid is calculated between the surrounding grid points. This may be iterated until a desirable operating point is reached. In other examples, a gradient search technique is used to identify the operational minimum 1102.

In some examples, there may not be an operational minimum 1102 in the 3-dimensional plot 1100. This leads to the input parameters defaulting to the edge of the surface, which does not provide an overclocking setpoint that is increased. In one example, a minimum expected temperature is included as a constraint on the search. This moves the search boundary in on the graph. In another example, the plot is reversed in sign and the search is performed for a maximum setpoint that remains within operational constraints. In this example, if the search reaches a limit, for example, within a valley, a setpoint is obtained. Other techniques may be used as well, such as generating a line that fits points in a valley, for example, through linear regression, then selecting the setpoint as the point at which the line intersects the maximum allowed temperature.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A method for overclocking a computer system, comprising:
    predicting a stable operating frequency for a central processing unit (CPU) in a target system based, at least in part, on an output of a prediction model generated from data collected for a test system;
    adjusting an operating frequency for the CPU to the stable operating frequency; and
    running a benchmark test to confirm that the CPU is operating within limits.

2. The method of claim 1, comprising:
    running the benchmark test on the test system to generate a data set; and
    creating the prediction model using the data set to correlate input parameters to output parameters in the data set for the test system.

3. The method of claim 2, comprising:
    determining a range of input parameters for the test system;
    iterating through the range of input parameters; and
    running the benchmark test at each combination of input parameters while logging the output parameters.

4. The method of claim 1, comprising:
    running the benchmark test on multiple test systems to generate a data set;
    creating an average system configuration; and
    creating the prediction model using the data and the average system configuration to correlate output parameters to input parameters in the data set.

5. The method of claim 1, comprising collecting the data for the test system by:
    identifying input parameters and ranges in a configuration of the test system;
    logging the configuration of the test system;
    configuring the test system with the input parameters;
    running the benchmark test to collect output parameters associated with the input parameters; and
    logging the output parameters for the test system.

6. The method of claim 5, wherein the input parameters comprise at least one of CPU frequency, CPU voltage, cache frequency, or cache voltage.

7. The method of claim 5, wherein the output parameters comprise at least one of CPU temperature, CPU core frequency, memory utilization, thermal throttling percentage, memory frequency, or CPU fan speed.

8. The method of claim 5, comprising performing a statistical regression to create the prediction model correlating the input parameters and the output parameters for the test system.

9. The method of claim 8, comprising determining a delta between the target system and the test system.

10. The method of claim 9, comprising generating a set of input parameters for the target system based, at least in part, on the delta between the target system and the test system.

11. The method of claim 1, wherein the prediction model comprises a neural network.

12. An overclocking system comprising:
    a processor to:
        generate a prediction model based on a benchmark test executed upon a test computer system, the test computer system comprising a first central processing unit (CPU) operating at a first CPU frequency and a first CPU voltage;
        predict a stable operating frequency for a target computer system by using the prediction model and input parameters received from the target computer system, the target computer system comprising a second CPU operating at a second CPU frequency and a second CPU voltage; and
        adjust the second CPU frequency of the target computer system based on the predicted stable operating frequency.

13. The overclocking system of claim 12, wherein the prediction model correlates the input parameters with output parameters associated with the benchmark test.

14. The overclocking system of claim 13, wherein the prediction model comprises a statistical correlation between the output parameters and the input parameters associated with the benchmark test.

15. The overclocking system of claim 14, wherein the statistical correlation between the output parameters and the input parameters is determined responsive to performing a statistical regression.

16. The overclocking system of claim 15, wherein the prediction model comprises a neural network.

17. A non-transitory machine-readable medium comprising instructions that, in response to being executed on a computing device, cause the computing device to:
- predict a stable operating frequency for a central processing unit (CPU) in the computing device based, at least in part, on a prediction model generated from data collected for a second CPU in a second computing device; and
- adjust an operating frequency for the CPU to the stable operating frequency.

18. The machine-readable medium of claim 17, comprising instructions that, in response to being executed on the computing device, cause the computing device to:
- identify a range for an input parameter associated with the second CPU;
- run a benchmark test on the second CPU at the input parameter; and
- log an output parameter associated with the input parameter based on the benchmark test;
- increment the input parameter; and
- iterate through the range for the input parameter to complete the benchmark test.

19. The machine-readable medium of claim 17, comprising instructions that, in response to being executed on the computing device, cause the computing device to generate the prediction model by performing a statistical regression using the data collected for the second CPU in the second computing device.

20. The machine-readable medium of claim 19, wherein the prediction model comprises a neural network.

* * * * *